Aug. 19, 1941.  C. M. TUTTLE ET AL  2,253,054
DEVICE FOR MEASURING FLATNESS OF GLASS
Filed Sept. 13, 1939  2 Sheets-Sheet 1
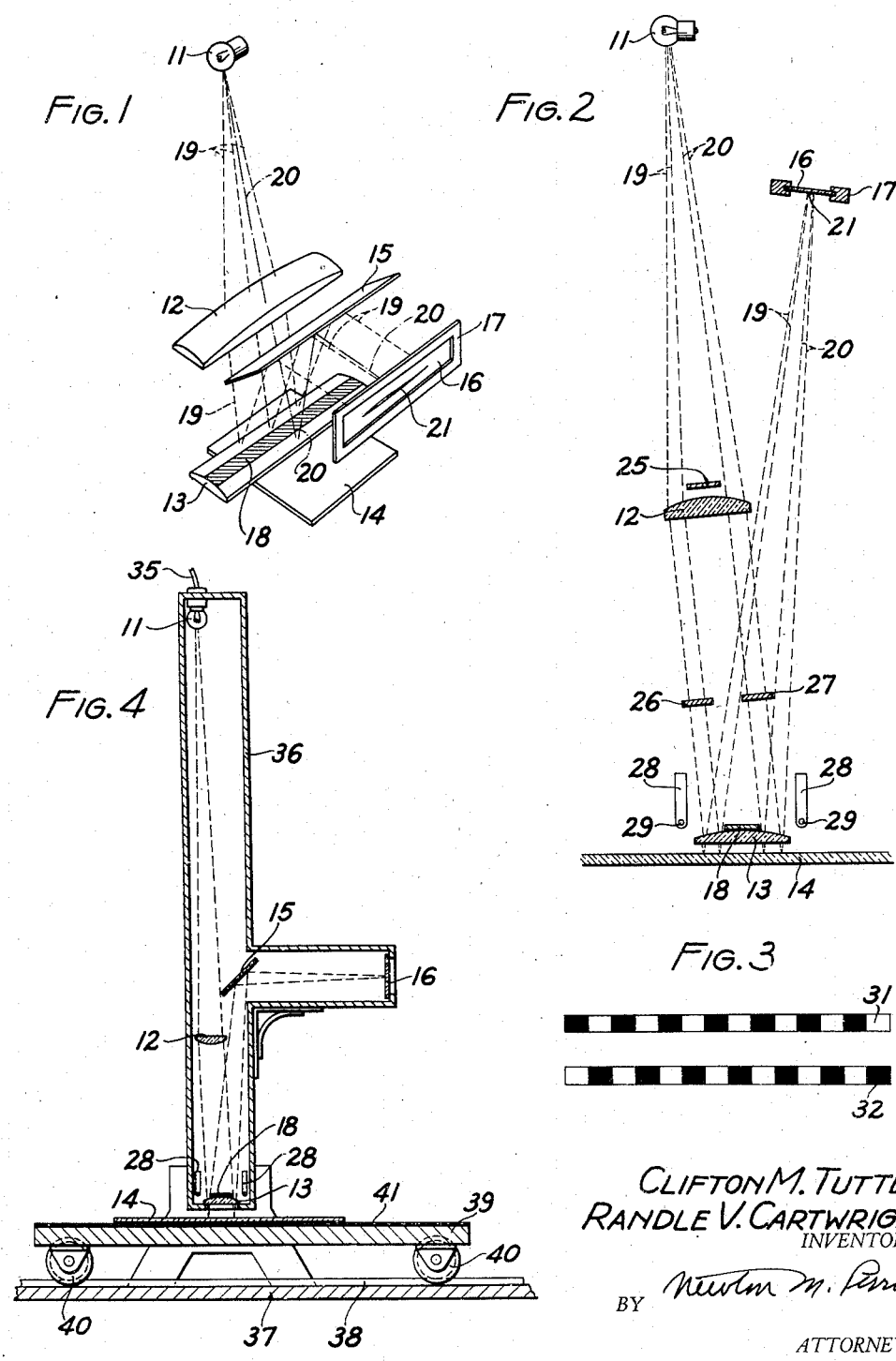
CLIFTON M. TUTTLE
RANDLE V. CARTWRIGHT
INVENTORS
BY
ATTORNEY Aug. 19, 1941. C. M. TUTTLE ET AL 2,253,054
DEVICE FOR MEASURING FLATNESS OF GLASS
Filed Sept. 13, 1939   2 Sheets-Sheet 2
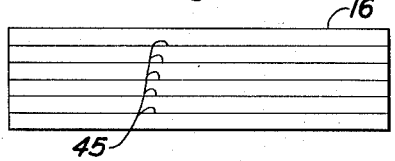
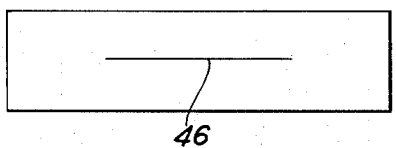
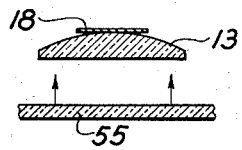
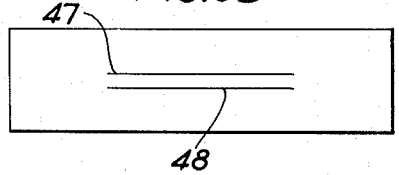
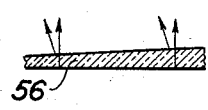 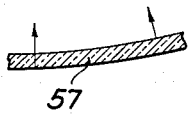
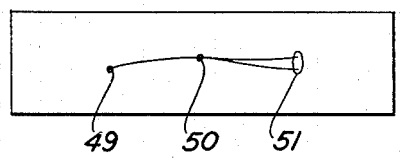
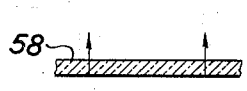 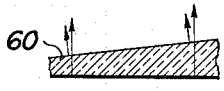
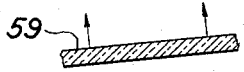 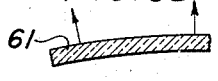
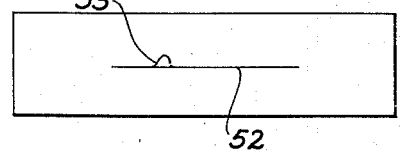
CLIFTON M. TUTTLE
RANDLE V. CARTWRIGHT
INVENTORS
BY
ATTORNEY Patented Aug. 19, 1941

2,253,054

UNITED STATES PATENT OFFICE 2,253,054

DEVICE FOR MEASURING FLATNESS OF GLASS

Clifton M. Tuttle and Randle V. Cartwright, Rochester, N. Y., assignors to Eastman Kodak Company, Rochester, N. Y., a corporation of New Jersey Application September 13, 1939, Serial No. 294,758

13 Claims. (Cl. 88—14)

This invention relates to a device for measuring the flatness of glass or similar materials.

It is an object of the invention to provide a device for measuring the flatness or the deviations from flatness of a reflecting surface and for measuring the deviation from parallelism of two reflecting surfaces such as the opposite sides of a sheet of glass.

It is a particular object of the invention to provide such a device which is rapid in operation and sufficiently accurate for most practical purposes.

According to the invention, the flatness of a sheet of glass or any other reflecting surface is tested by setting up an optical system involving the reflection of light from this surface and examining the image formed thereby. In one embodiment of the invention, collimated light is passed through the two marginal zones of a weak cylindrical lens whose longitudinally central portion has been masked off. The light then strikes the surface to be tested, which is placed immediately behind the lens, and this light is reflected back through the lens to form an astigmatic image on a ground glass or similar viewing screen positioned at a distance from the lens equal to the focal length of the double lens system formed by this reflecting surface and the cylindrical lens through which the light passes twice.

With such an arrangement a perfectly flat reflecting surface produces on the ground glass a single straight line image parallel to the cylindrical axis of the test lens. Any deviation of the reflecting surface from absolute flatness, along the length of the test lens, appears as a curvature of this line image or as a deviation from parallelism with the lens axis. Any deviation from flatness in the other direction, i. e. any angular difference of the two light beams reflected through the two marginal zones of the lens, causes two separate images to appear on the ground glass. These two images are separated by a distance which depends on the amount of deviation from flatness. The system is extremely sensitive and a curvature of the reflecting surface sufficient to cause a thickness increase of $\frac{1}{1000}$ of an inch over an area of one inch diameter will, depending on the power of the lens used, cause an image shift of a quarter inch or more. Obviously, a weak test lens gives a long optical path to the viewing screen which path acts as an optical lever whereby small distortions in the glass surface cause large shifts in the image.

Broadly speaking the beam of incident light need not be collimated provided it is of some more or less constant vergence (convergence or divergence) and provided the viewing screen is placed substantially at the focus of the reflected light, i. e. in a plane conjugate to the incident light. Collimated light is much more preferable however since this provides a unit magnification longitudinally of the cylindrical lens, which means that the image seen on the viewing screen will be the same length as the glass or other surface being tested. The mask which shadows the longitudinally central area of the lens may be anywhere in the system so long as it does not interfere with the light going to or from the marginal zones of this lens. That is, the mask can be near the light source, near the cylindrical lens itself or even between this lens and the viewing screen. In fact it is not necessary, although it is much preferable, to use any such mask. If no mask is used the image instead of doubling when the reflecting surface is not flat, merely becomes more diffused.

We have found that when a double surface is tested such as a sheet of glass, (the front and back surfaces both being reflecting) it is possible to measure and distinguish both deviations in flatness over one surface and deviations from parallelism of the two surfaces. The latter effect is termed "wedging." In the case of wedging each marginal zone separately forms two distinct line images whereas a distorted but unwedged glass sample gives two images only when both sides of the lens are used.

One embodiment of the invention provides a separate mask or shutter for each of the two lens zones so that when two images are seen one can easily distinguish between curved and wedged glass by operating either or both shutters.

To overcome the need for such shutters and to provide a rapid method of distinguishing between wedging and distortion of the glass surface and also to give increased sensitivity to the instrument, a preferred embodiment of the invention provides filters or multiapertured masks in either or both of the marginal light beams. The image formed by a filtered light beam is, of course, colored and one formed by a multiapertured beam appears as a broken line. Thus it is quite simple when viewing the test images to distinguish between the parts of the image formed by the two lens zones. If complementary color filters or complementary multiapertured masks are used in the two beams, a perfectly flat reflecting surface gives a straight white line image. Any deviation from flatness causes the image to separate into two colored lines in one case and into two broken lines in the other case. The use of a longitudinally central mask on the test lens is less necessary when filters or multiapertured masks are used provided these distinguishing means extend to the center of the working beam or at least cover the major portion of it.

The invention will be more fully understood from the following description of one embodiment thereof when read in connection with the accompanying drawings in which:

Fig. 1 is a perspective view of one embodiment of the invention.

Fig. 2 is a cross section in elevation of a similar embodiment of the invention.

Fig. 3 illustrates a two part multiapertured mask which may be used with the apparatus shown in Fig. 2.

Fig. 4 illustrates another form of the embodiment shown in Figs. 1 and 2.

Fig. 5 illustrates one form of viewing screen.

Figs. 6A, 6B, 6C, and 6D show typical images which may appear on the viewing screen of the invention.

Fig. 7 shows an enlarged cross section of a piece of glass capable of giving the image shown in Fig. 6A and the adjacent portion of the optical system according to the invention.

Figs. 8A and 8B show glass cross sections capable of giving the image shown in Fig. 6B.

Figs. 9A, 9B, 9C and 9D show the cross sections of different forms of glass corresponding to Fig. 6C.

Fig. 10 shows the cross section of glass corresponding to Fig. 6D.

Similar numerals refer to similar items in each of the figures. In Figs. 1, 2, and 4 light from a source 11 passes through a collimating lens 12, then through a long cylindrical test lens 13 and is reflected from the surface of a reflecting sample 14 which is to be tested. This reflected light again passes through the test lens 13 and is brought to focus thereby on a ground glass or other viewing screen 16 carried by a suitable support 17. For convenience (as shown in Figs. 1 and 4) a mirror or other reflecting surface 15 may be inserted in the reflected light beam to permit the viewing screen 16 to be placed at a convenient angle. In the embodiment shown, the longitudinally central portion of the lens 13 is masked by a mask 18 so that only light directed toward the marginal zones of the lens is used to form an image on the screen 16. A mask such as 25 may be placed anywhere in the optical system to eliminate the paraxial beam. If the sample glass 14 is perfectly flat, the light rays 19 traversing one of the marginal zones of the test lens 13 will be brought to focus in the same straight line as the light rays 20 traversing the other marginal zone of the lens 13.

However, any distortion of the surface 14 will cause a deviation of each of these images from their normal position and from each other, which results in a curved, double or sloping image 21 as shown in Fig. 1.

In order to have some quantitative measures of the distortion, the viewing screen 16 is preferably provided with horizontal lines 45 as shown in Fig. 5, which lines are equally spaced to represent some predetermined amount of distortion. Even a very slightly curved surface, e. g. one having a radius of curvature in excess of 40 feet, can be made to cause a doubling of the image 21 with the two portions of the image separated by a quarter inch or more on the viewing screen 16.

A few typical forms of the image 21 and the cross section of the glass under the lens 13 to correspond to these forms are illustrated in Figs. 6A to 10. The small arrows indicate the direction of the light reflected from the glass surface. The slight convergence of these arrows due to the focusing power of the lens 13 is not indicated.

A plane flat piece of glass such as 55 will provide a single straight line image 46. If however, the glass is slightly distorted as shown in exaggerated form at 57, the rays through one marginal zone of the lens 13 will come to focus in a line displaced from the focus of the rays through the other marginal zone of this lens. The reason for this shift is seen in Fig. 2 when taken in connection with Fig. 8B in which the small arrows show that the beams 19 and 20 are directed toward different foci and thus form two distinct images 47 and 48. Of course the form of distortion shown in Fig. 9D gives a similar doubling of the image.

Thus, if only a single surface such as the reflecting surface of an opaque material is being tested, this duplication of lines 47 and 48 indicates a distortion of the type 57 or 61. If however a double reflecting surface such as a sheet of glass is being tested, the doubling of the image may be due to an entirely different cause namely wedging, as shown in Fig. 8A. The sample of glass 56 reflects parallel light to both portions of the test lens 13, but also sends two rays which are not parallel to the first two rays through both portions of the lens 13. In this case the double lines 47 and 48 remain even if one side of the test lens 13 is masked off, whereas one of the lines 47 or 48 disappears if the lens is so masked when testing sample 57 or 61. Shutters for conveniently masking off one or the other zone of the test lens 13 are shown as masks 28 pivoted at the points 29 in Figs. 2 and 4. Obviously it is easy to distinguish between distortions of the 57 and 61 types by noting which line 47 or 48 disappears when one of shutters 28 is closed.

Another convenient method of distinguishing between the rays coming from the two zones of the lens 13 is illustrated in Fig. 2 by identifying means 26 and 27 placed respectively in the two beams. These identifying means may be near the lens 13 or elsewhere in the optical system. One form of identifying means is a multiapertured mask such as shown in Fig. 3. Each of the multiapertured masks 31 and 32 comprises a series of apertures and a series of opaque areas. With this identifying means, each of the images formed on the ground glass screen appears as a broken line. If the two masks 31 and 32 are complementary, a perfectly flat piece of glass such as 55 will give a continuous white straight line. However, any distortion such as shown in Fig. 8B will cause this line to break up into two broken portions. On the other hand, a wedging such as shown in Fig. 8A will merely cause this single line to break up into two solid lines.

In a different embodiment, the identifying means 26 and 27 consist of light filters for example one green and one red. If additive complementary colors are selected for these filters, the image 46 produced by a flat glass 55 will again appear as a solid white line. The double image 47 and 48 as produced by a wedge glass 56, will appear as two solid white lines, whereas this double image will appear as two different colors if produced by a distorted glass 57 or 61.

In actual practice, a distorted piece of glass may comprise any combination of curving and doubling and give an image such as 49, 50, 51. In this example one end 58 of the strip of glass under the cylindrical lens 13 is plane parallel and gives that part of the curve marked 49. The center 59 of this strip is plane parallel but is tipped with respect to 58 and produces the part 50 of the image. Between 49 and 50 the image is curved or merely oblique to the test lens 13 depending on the rate of change of distortion between sections 58 and 59. The other end of this strip of glass gives the image 51 and is of the form 60, 61 or 57. However it would be easy to distinguish between the two forms 60 and 61 (or 57) by use of the shutters 28 as above described.

If the sample 14 of glass being tested is moved along under the test lens 13, the pattern appearing on the viewing screen 16 changes and takes on various forms such as those shown in Figs. 6A, 6B, 6C, and 6D. When testing glass in this manner, certain tolerance limits may be set up and if the glass stays within these tolerance limits as indicated for example by the image 21 staying between two of the lines 45 on the screen 16, it is acceptable.

If a flaw or dimple appears as in the glass section 62, the image 52 on the viewing screen shows a local distortion such as 53. This local distortion of the image appears first as a downward curve and then as an upward curve as the glass 14 is moved and the dimple passes under one side of the test lens 13. Obviously, numerous combinations of these typical images shown in Figs. 6A to 6D, may appear when testing actual samples of glass. For many purposes wedging of the glass is not detrimental and only dimples or bad distortion of the upper surface requires that the glass be discarded.

One very practical arrangement which we have found for testing glass in large quantities is shown in Fig. 4. The optical system including the lamp 11, the collimating light lens 12, the test lens 13 with or without shutters 28, the mirror 15 and the viewing screen 16 are all mounted in a housing 36. The lamp 11 is supplied with electric current through the leads 35. This whole test system in the housing 36 is mounted on a support 37 such as the top of a desk or table.

The support 37 is provided with rails 38 on which the wheels 40 of a conveyor or truck 39 are free to run. This truck 39 has a horizontal upper surface covered with a thin soft material 41 such as plush, felt, or cork. The sample 14 of glass to be tested is laid on this soft surface 41 and the truck 39 is moved under the test lens 13. In practice, the viewing screen 16 is observed while the sample 14 is moved from one side to the other under the test lens 13. The sample 14 is then rotated through 90 degrees and again passed under the test lens while observing the image on the screen 16. If the image on the screen 16 does not deviate beyond the predetermined tolerance limits, this sample of glass 14 is deemed to be acceptable.

If the test lens 13 is quite long and the viewing screen 16 is of a corresponding length, a large number of samples of glass may be tested simultaneously. We have found that this particular arrangement is quite suitable for routine testing and that it is particularly adaptable to semi-automatic operations, wherein the glass plates are fed continuously through the test area under the test lens 13.

Having thus described the details of one embodiment of our invention, we wish to point out that it is not limited to the specific structures shown but is of the scope of the appended claims.

What we claim and desire to secure by Letters Patent of the United States is:

1. An optical system for determining the flatness of a reflecting surface comprising means for supporting the reflecting surface in a substantially certain plane, a low power cylindrical lens immediately in front of said plane, means for illuminating only the two longitudinally marginal areas of the lens with light of the same vergence and a viewing screen positioned at the focus of the light transmitted through said areas and reflected back through said areas by the reflecting surface when the latter is in said plane.

2. An optical system according to claim 1 having a color filter in the path of the light traversing one of said marginal areas of the lens.

3. An optical system according to claim 1 having a color filter in the path of the light traversing one of said marginal areas of the lens and a differently colored color filter in the path of the light traversing the other marginal area.

4. An optical system according to claim 1 having filters of complementary colors respectively in the paths of the light traversing the two marginal areas of the lens.

5. An optical system according to claim 1 having a multiapertured mask in the path of the light traversing one of said marginal areas of the lens.

6. An optical system according to claim 1 having complementary multiapertured masks respectively in the paths of the light traversing the two marginal areas of the lens, the apertures being in complementary relationship for giving a continuous image when the reflecting surface is flat.

7. An optical system according to claim 1 having between the illuminating means and viewing screen, removable means for masking completely the light directed toward one of the marginal areas of the lens whereby only light from the other marginal area will reach the viewing screen.

8. A device for determining the flatness of a sheet of material having a reflecting surface comprising a horizontal support for the sheet, a cylindrical lens immediately above said support a distance greater than the sheet thickness, a source of constant vergence light not quite vertically above the lens for supplying an incident light beam for illuminating the reflecting surface through the lens, a reflector above the lens adjacent to said incident beam for receiving the light reflected upward through the lens and for reflecting it substantially horizontally, a viewing screen positioned at the focus of the light from the reflector, a mask cutting off from the viewing screen all light directed from the source toward a longitudinally central area of the lens, and means for supporting in these relative positions, said horizontal support, said lens, said light source, said reflector, said viewing screen and said mask.

9. A device according to claim 8 in which the horizontal support for the sheet is horizontally movable and which has guides carried by said supporting means for guiding this horizontal movement of the support.

10. A device for determining the flatness of a sheet of material having a reflecting surface comprising means for supporting the sheet horizontally and moving it in its own plane, a long cylindrical lens immediately above said support a distance greater than the sheet thickness, a mask masking the longitudinally central area of said cylindrical lens, a source of collimated light not quite vertically above the lens for illuminating the reflecting surface through the lens, a reflector above the lens adjacent to the collimated light beam for receiving light reflected upward through the lens and for reflecting it substantially horizontally, a viewing screen positioned at the focus of the light from the reflector and horizontal lines on the viewing screen separated by a distance corresponding to the shift of the image formed on this viewing screen which would result if the reflecting surface were rotated around the cylindrical axis of said cylindrical lens through a predetermined minute angle, and means for carrying the sheet supporting and moving means, the lens, the mask, the light source, the reflector and the viewing screen.

11. An optical system for determining the flatness of a reflecting surface comprising means for supporting said surface in a substantially certain plane, a low power cylindrical lens immediately in front of and with its cylindrical axis substantially parallel to said certain plane, means for supplying a light beam to the front of the lens and through the lens to said certain plane whereby when a reflector is in said certain plane it reflects the beam back through the lens and a viewing screen positioned to receive the light beam when so reflected through the lens, the position of said screen being conjugate to the incident light with respect to the double lens system formed by the cylindrical lens and a reflector in said certain plane.

12. An optical system according to claim 11, including means in front of the lens for collimating the light incident thereon and wherein the viewing screen is in the focal plane of said double lens system.

13. An optical system according to claim 11 having means between the light supplying means and the viewing screen for intercepting that portion of the light beam which is longitudinally central with respect to the cylindrical lens.

CLIFTON M. TUTTLE.
RANDLE V. CARTWRIGHT.